208-111 SF
1/6/87 OR H 000,196

United States Statutory Invention Registration [19]

[11] Reg. Number: H196

[43] Published: Jan. 6, 1987

Edwards et al.

[54] LARGE PARTICLE ZEOLITE CONTAINING CRACKING CATALYST EXHIBITING IMPROVED HYDROTHERMAL STABILITY

[75] Inventors: Grant C. Edwards, Silver Spring; Kuppuswamy Rajagopalan, Columbia, both of Md.

[73] Assignee: W. R. Grace & Co., New York, N.Y.

[21] Appl. No.: 754,302

[22] Filed: Jul. 12, 1985

[51] Int. Cl.[4] ..... C10G 47/02; C10G 47/12; C10G 47/16; B01J 29/06

[52] U.S. Cl. ..... 208/111; 502/65

[58] Field of Search ..... 502/65

[56] References Cited

U.S. PATENT DOCUMENTS 3,574,538 4/1971 McDaniel et al. ..... 502/68 X
3,957,689 5/1976 Ostermaier et al. ..... 502/65

*Primary Examiner*—Richard D. Lovering
*Assistant Examiner*—Eric Jorgensen
*Attorney, Agent, or Firm*—Arthur P. Savage

[57] ABSTRACT

A highly active hydrocarbon conversion catalyst is disclosed which by virtue of it being promoted by larger than conventional particle size zeolite exhibits significantly improved hydrothermal stability.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LARGE PARTICLE ZEOLITE CONTAINING CRACKING CATALYST EXHIBITING IMPROVED HYDROTHERMAL STABILITY

BRIEF DESCRIPTION OF THE INVENTION

The present invention relates to hydrothermally stable catalysts of high activity and methods for their preparation. More specifically said invention relates hydrothermally stable crystalline aluminosilicates the NaY type faujasite which when incorporated as promoters into compositions used as hydrocarbon conversion catalyst in the form of larger than heretofore commercially available particles renders said compositions extraordinarily stable against hydrothermal deactivation.

The present invention therefore has as an object to provide a catalyst composition particularly useful in the area of petroleum cracking, which has a novel characteristic in that it is promoted by Y type rare earth exchanged faujasite material of a larger than conventionally used particle size and which as a result thereof displays the unexpected property of being more stable to hydrothermal deactivation than similar catalysts promoted by conventionally sized commercially available Y type rare earth exchanged faujasite.

Furthermore, the subject invention has as an object to provide a hydrocarbon conversion catalyst which while exhibiting improved hydrothermal deactivation stability is highly active and can be prepared by a procedure which does not involve drastically altered methodology over that used in the preparation of conventional hydrocarbon conversion catalysts and therefore does not require the taking into consideration of increased production costs.

These and other objects of the present invention will become clear as the description of the invention proceeds.

DETAILED DESCRIPTION OF THE INVENTION

The present invention relates to the production of crystalline alumino-silicates commonly referred to as molecular sieves. More specifically, this invention relates to the preparation of faujasite materials which have a large particle size and which when used as promoters in particularly catalytic petroleum conversion compositions renders said compositions extraordinarily hydrothermally stable.

Faujasite is a naturally occurring alumino-silicate. It has a characteristic X-ray structure. The synthetic materials designed "zeolite X" and "zeolite Y" by the Linde Division of Union Carbide Corporation are commonly referred to as synthetic faujasites. Zeolite Y is described in U.S. Pat. No. 3,130,007 and is generally similar to zeolite X described in U.S. Pat. No. 2,882,244. The chemical formula for zeolite Y given in U.S Pat. No. 3,130,007, is as follows: $0.9+0.2\ Na_2O:wSiO_2:xH_2O$, wherein w has a value of greater than 3 and up to about 6 and x may have a value of as high as 9.

For a variety of reasons the prior art has concerned itself with providing zeolite materials of controlled and/or uniform particle size since it has been clearly recognized that size of zeolite materials critically affects separative/absorptive properties, conversion efficiency, ion exchange ability, physical strength, hydrodynamics when the catalyst is used as a fluid bed, etc. In an example of such prior art one may refer to U.S. Pat. Nos. 4,173,622, 5,235,856, 4,271,135 and 4,371,510, all of which are directed at the production of zeolitic materials with specific emphasis on the control of preparative process so as to result in a zeolitic material characterized by a desired particle size.

Particle size is determined conventionally using Scanning Electron Micrographs (SEM). Presence of agglomeration and intergrowths in Y faujasite make this estimate uncertain. We have developed a novel method of measuring an effective (average) particle size by measuring the external surface area per unit mass of the zeolite. This measurement is based on t plot isotherm method described by Lippens and deBoer (Journal of Catalysis, Volume 4, pages 319–323 (1965)) and improvements suggested by Lecloux and Pirard (Journal of Colloid and Interface Science Volume 70, No. 2, pages 265 to 281 (1979)). The t plot is a graphical representation of volume of nitrogen adsorbed at liquid nitrogen temperature as a function of statistical thickeness of the nitrogen film on a solid surface. Slope of the t plot is related to accessible surface area. In an appropriate region of the t plot when adsorption takes place exclusively on the external surface, slope of the t plot is related to external surface area. Effective particle size is defined as that uniform dimension of cubic particles which yields the same external surface area per unit mass as the measured value for a zeolite sample.

Effective particle size of NaY type faujasite used conventionally in catalytic cracking compositions and which is commercially available is in the 0.33 to 0.36 micrometer range while the effective particle size of the present invention's developed NaY type faujasite lies in the 0.6 to 1.0 micrometer range, a difference in size which we believe to be the sole factor in imparting significantly improved hydrothermal stability characteristics to a catalytic composition promoted therewith as will be shown later on.

Improving hydrothermal stability of catalytic zeolitic compositions has been an object of extensive research programs ever since synthetic zeolites were first produced. It is known that, when chemical processes are based on chemical reactions carried out by means of catalysts, the catalyst undergoes both reversible and irreversible transformations which decrease the effectiveness thereof and necessitate the frequent or occasional regeneration and/or replacement of the catalyst itself. Such a process would be improved by decreasing the rate of such irreversible transformations which cannot be reversed by regeneration. Decreasing the rate of irreversible transformations will increase the effective employment period of the catalyst.

The activity of hydrocarbon conversion catalysts gradually declines due to deposition of carbonaceous material and the resulting clogging of the pore structure and blocking of active catalytic sites. This is a reversible transformation, and the catalyst activity usually can be mostly restored by regeneration.

Irreversible transformations of the catalyst are loss of pore structure, loss of crystallinity of a crystalline, active component, loss of catalytic sites due to sintering, etc.

While attempts have been made to minimize catalyst deactivation by e.g., partially poisoning a zeolite catalyst with a metal, by sulfiding a zeolite catalyst and, further, by continuously introducing a sulfur compound into the reaction system, zeolite catalysts continue to show the problem of deactivation when subjected to high temperatures particularly in the presence of steam.

The cracking process, in particular, operates at two levels of temperature. The catalyst is in contact with a hydrocarbon vapor to be converted at a high temperature of perhaps 427° C.–566° C. In this process called cracking, the catalyst becomes contaminated with carbon and high-boiling hydrocarbon. In order to remove the contaminants, the catalyst is subjected to regeneration before it is returned to the cracking zone. The catalyst is purged with steam to remove hydrocarbon vapors and introduced into a regeneration zone where the carbon and hydrocarbons in the catalyst are burned off at a much higher temperature, perhaps 521°–816° C. and in the presence of steam, by hot air introduced into the regeneration zone. The regeneration temperature is many degrees higher than the reaction temperature. The regenerated catalyst is returned to the reaction zone. The zeolite component of the prior art catalysts loses a substantial portion of its crystallinity and activity under these hydrothermally destabilizing conditions of the regeneration zone.

There is prior art documentation which attests to the quest researchers endeavor themselves in order to increase the hydrothermal stability of zeolites as exemplified in U.S. Pat. Nos. 3,494,519, 3,928,236, 4,013,590 and 4,152,297.

The above mentioned references teach a variety of methods for improving the hydrothermal stability of hydrocarbon conversion catalysts ranging from contacting the catalyst with hydrocarbons under selected conditions in advance of start-up to treatment with a chelating agent of catalyst calcined in the presence of steam.

None of the prior art references has been directed at the present invention's approach, namely to effect hydrothermal stabilization of a hydrocarbon catalyst composition by means comprising the use of a large particle Y type faujasite promoter.

What has therefore been done was first to prepare a large particle NaY faujasite (effective particle size within the range 0.6 to 1 micrometer), secondly to prepare a cracking catalyst composition promoted by ion-exchanging said large particle NaY faujasite with rare earth cations or other suitable cations, and thirdly, in order to run comparative tests a cracking catalyst composition was prepared using the conventional commercially available NaY zeolite (of 0.35 micrometer effective particle size) ion-exchanged with earth cations or other suitable cations as a promoter in a similarly prepared catalyst composition.

The quantitative aspects and the detailed methodology used will become apparent as the description of the invention proceeds in the form of the following examples.

Example 1

Preparation of Large Particle NaY Faujasite

Two solutions and one slurry were prepared. Solution A was dilute sodium aluminate solution made by mixing 6,175 g sodium aluminate solution (21.4% $Al_2O_3$; 18.2% $Na_2O$) into 8,263 g water. Solution B was made by dissolving 269 g sodium hydroxide pellets in 11.4 kg water. A mixture of 43.2 kg commercial sodium silicate (41°Be'; 1.0 $Na_2O$: 3.22 $SiO_2$ ratio) with 14.5 kg water and 254 g seeds or nucleation centers (oxide ratio 16 $Na_2O$: 1.0 $Al_2O_3$: 15 $SiO_2$: 320 $H_2O$) to make a slurry.

The preparation of the seeds or nucleation centers is taught in U.S. Pat. No. 3,574,538 and may be carried out as follows:

29 g of sodium aluminate ($Na_2O$:$Al_2O_3$: $3H_2O$) was dissolved in 368 g of $H_2O$. A sodium silicate solution comprising 420 g of sodium silicate (28.5% $SiO_2$: 8.7% $Na_2O$); 112 g of NaOH and 100 g of $H_2O$ was prepared. These solutions were cooled to about 20° C., then mixed with stirring for 1. The mixture was then aged without stirring at about 20° C. for about 16 hours.

Each of these three streams was fed to a high speed mixer by its own pump. Solutions A and B were each pumped at about 500 ml/min. while the slurry was pumped at about 2.8 liters/min. The mixing of the three streams together formed a slurry which had the oxide ratio effectively of 6.5 $Na_2O$: 1.0 $Al_2O_3$: 16 $SiO_2$: 280 $H_2O$; the slurry was transferred to a closed 76 liter reactor made by the Pfaudler Co. which was heated by a steam jacket and fitted with a stirrer and a steam condenser. After the slurry was placed into the reactor, it was heated with rapid stirring to 100°±1° C. Then the mixer was turned off and the heating was continued for 17 hours. The progress of the crystallization of the large particle fauasite was followed by taking samples of the slurry from time to time. These small samples of slurry were filtered to recover the solid zeolite, washed with water, and dried; each was examined by X-ray powder diffraction to determine its crystallinity vs. a well crystallized sample of NaY faujasite. After 17 hours the preparation had 105% crystallinity of the standard; therefore, the heat was turned off, ice was added to reduce the slurry temperature to about 90° C., and the slurry was filtered and washed on a 50 cm diameter Buchner filter. A portion of the washed filter cake was dried at 105° C. and analyzed by X-ray powder diffraction and was found to be a highly crystalline NaY faujasite zeolite which had a unit cell size of 24.67 A, a $SiO_2$/$Al_2O_3$ ratio of 4.9 by chemical analysis, and a nitrogen surface area of 913 $m^2/g$ as measured by the BET method using a Digisorb 2500 instrument made by Micromeritics, Inc. of Norcross, Ga. Effective particle size was determined by the t plot method as 0.65 micrometer. Portions of the batch of large particle NaY were made into various types of petroleum cracking catalysts and compared with commercial NaY zeolite as illustrated by the following examples.

Example 2

Preparation of a Cracking Catalyst from Large Particle (L.P.) NaY Faujasite, Clay and Silica-Alumina Sol The following petroleum cracking catalyst was made according to the teachings of U.S. Pat. No. 3,957,689. A silica-alumina sol was made by rapidly mixing a stream of sodium silicate solution, Solution A, which contained 12.5% $SiO_2$ made from a dilution of the same commercial sodium silicate solution used in Example 1, with a stream of acidified aluminum sulfate (alum) solution, Solution B. Solution B contained 12.2 wt. % sulfuric acid and 70 grams/liter $Al_2O_3$ derived from alum, $Al_2(SO_4)_3.15–18\ H_2O$.

Solution A and Solution B were rapidly mixed together in a high speed mixer in the approximate ratio of volumes of 1.5 l Solution A to 0.5 l Solution B. The pH was held at 3.1±0.1 by adjusting the exact flow of Solution B, and 12.0 kg of sol was formed. To the 12.0 kg of silica-alumina sol were added 4,247 g of kaolin clay (Thiele RC-32 from the Thiele Kaolin Co. or Natka kaolin from the National Kaolin Co. are suitable) with rapid stirring. Next was added a slurry of 986 g of SRA alumina, the preparation of which is known and described in U.S. Pat. No. 4,154,812, in one 1 of water acidified to pH 4.0±0.2. The SRA is a form of $Al_2O_3 \cdot H_2O$ which has a total volatile content or loss upon ignition of 25.4%. Lastly, a slurry of 1,694 g of filter cake of L.P. NaY (Total volatiles=64%; $Na_2O$=14.5%) in 2 l of water acidified to pH 4.0±0.2 was added to the silica-alumina sol/clay/SRA mixture with rapid stirring. Then the slurry was spray dried in a Bowen spray dryer using an inlet temperature of 316° C. and an outlet temperature of 149° C. A 3,000 g portion of the spray dried product was slurried in 11.3 l of hot deionized water at 60°-71° C. and filtered on a 50 cm diameter Buchner filter. The filter cake was rinsed three times with 3 l of hot water. Then the cake was reslurried in 9 l of hot water and filtered again. The cake was next slurried in 10 l of hot water and 215 ml of mixed rare earth chloride solution containing 59-61 wt. % $RECl_3.6H_2O$ (The relative proportions of rare earths were approximately 45% La, 26% Ce, 7% Pr, 21% Nd, and 1% Sm by oxides) was mixed into the slurry. The slurry was gently stirred for 20 minutes and kept at a temperature of 60°-71°, and the pH was kept at about 4.7-5.2. Lastly, the slurry was filtered again and rinsed with three 3 l portions of hot water. The product was dried and was found to be a microspheroidal, fluid catalyst which had a particle size in the range of 40-120 micrometers.

EXAMPLE 3

Preparation of a Cracking Catalyst from Conventional Commercially Available NaY Faujasite According to the same procedure described in Example 2, a similar cracking catalyst was prepared using a commercially available conventional NaY faujasite which had a $SiO_2/Al_2O_3$ ratio of 4.9±0.1 and an effective particle size of 0.35 micrometer.

The finished catalysts were compared in the tests given below in Table I. The feedstock for the cracking test was West Texas Heavy Gas Oil (WTHGO) and it was cracked using a modification of the procedure published by F. G. Ciapetta and D. S. Henderson entitled "Microactivity Test For Cracking Catalysts", Oil and Gas Journal, Vol. 65, pages 88-93, Oct. 16, 1967. Microactivity tests are routinely used in the petroleum industry to evaluate cracking catalysts in the laboratory. The petroleum fraction was cracked over these catalysts using the following test conditions.

| | |
|---|---|
| Temperature | 499° C. |
| Weight Hourly Space Velocity (WHSV) | 16 |
| Catalyst to oil ratio | 3 |

The microactivity test was conducted by passing 0.67 g WTHGO through 2.0 g of catalyst in 1.25 minutes. The products were collected and the percent conversion of gas oil into hydrogen, light gases, gasoline range hydrocarbons, light cycle oil, heavy cycle oil, etc. was determined by gas chromatography.

TABLE I

| | Catalyst from Example 2 | Catalyst from Example 3 |
|---|---|---|
| Effective Particle Size of Y Type | .65 | .35 |

TABLE I-continued

| | Catalyst from Example 2 | Catalyst from Example 3 |
|---|---|---|
| Faujasite, micrometer | | |
| Catalyst | | |
| Formulation, Wt. % (dry basis) | | |
| Zeolite | 10 | 10 |
| $SiO_2$ | 20 | 20 |
| Clay | 60 | 60 |
| $Al_2O_3$ from SRA | 10 | 10 |
| Chemical Analyses (Wt. %) | | |
| $Na_2O$ | 0.34 | 0.36 |
| $Re_2O_3$ | 2.6 | 2.1 |
| Microactivity (Volume % Conversion) After Indicated Steam Deactivation | | |
| S-13.5[1] (standard deactivation) | 66.7 | 73.7 |
| Amoco 1500[2] (severe deactivation) | 66.0 | 57.8 |
| Change in Microactivity, S-13.5 vs. Amoco 1500 | −0.7 | −16.0 |

[1]Steam deactivation: 8 hours at 732° C., 100% steam, and 1.1 kg/cm² gauge pressure of steam.
[2]Steam deactivation: 5 hours at 816° C., 100% steam, and 0 kg/cm² gauge pressure of steam.

Hydrothermal stability of a catalyst is measured by difference in microactivities after moderate (e.g., S-13.5) and severe (e.g., Amoco 1500) hydrothermal deactivations. Hydrothermally stable catalysts retain a high microactivity even after severe hydrothermal deactivation.

Analysis of the data in Table I resulting from comparative tests run on a conventional catalytic cracking composition (Example 3) versus the invention's large particle faujasite promoted catalytic cracking composition (Example 2) clearly puts in evidence the superior hydrothermal stability of the latter as indicated by its higher microactivity after the Amoco 1500 severe steam deactivation.

For the sake of providing additional data to complement and confirm the above findings another set of experiments was carried out using this time 20% rather than 10% of the large particle NaY type faujasite prepared in Example 1.

Example 4

Preparation of a Catalyst from Large Particle NaY Faujasite, Clay and Silica-Alumina Sol A slurry was made from 3539 g Natka clay, 2,709 g L. P. NaY from a second batch of L.P. NaY made in the same manner as Example 1 (T.V.=41.2%; $Na_2O$=14.5%), and 12.0 kg silica-alumina sol. The slurry was spray dried using the Bowen spray dryer and the conditions used in Example 2a. Then 500 g of the spray dried product was slurried in 1.9 l hot deionized water (60°-71° C.) and filtered on a large Buchner filter 18.5 cm in diameter. The filter cake was rinsed three times with 0.5 l of hot water. Next, the filter cake was reslurried in 1.5 l of hot water and filtered again. The cake was rinsed three times with 0.5 l hot water. Then the cake was reslurried in 1.7 l hot water to which 44 ml of mixed rare earth chloride solution had been added. This is the same commercial rare earth chloride solution which was used to rare earth exchange the catalysts in Examples 2 and 3. The slurry was gently stirred for 20 minutes and kept at 60°-71° C. at a pH of 4.7-5.2. Lastly, the slurry was filtered again and rinsed three times with 0.5 l portions of hot water. The product was dried and found to be microspheroidal, fluid catalyst which had a particle size in the range of 40–120 micrometers.

Example 5

Preparation of Cracking Catalyst from Conventional Commercially Available NaY Faujasite A catalyst was prepared in a similar manner as in Example 4 except that 20% of conventional commercially available NaY type faujasite was used.

As in the case of comparative microactivity tests run on the products of Examples 2 and 3, under the same conditions comparative tests on the products of Examples 4 and 5 were conducted and the results tabulated as follows:

TABLE II

| | Catalyst from Example 4 | Catalyst from Example 5 |
|---|---|---|
| Effective Particle Size of Faujasite, micrometer | .65 | .35 |
| Catalyst Formulation, Wt. % (dry basis) | | |
| Zeolite | 20 | 20 |
| $SiO_2$ (from binder) | 20 | 20 |
| Clay | 50 | 50 |
| $Al_2O_3$ from SRA | 10 | 10 |
| Chemical Analyses (Wt. %) | | |
| $Na_2O$ | 0.73 | 1.1 |
| $Re_2O_3$ | 4.35 | 5.12 |
| Microactivity (Volume % Conversion) After Indicated Steam Deactivation | | |
| S-13.5 (standard deactivation) | 83.5 | 82.6 |
| Amoco 1500 (severe deactivation) | 78.0 | 42.0 |
| Change in Microactivity, S-13.5 vs. Amoco 1500 | −5.5 | −40.5 |

Again, analysis of the data in Table II confirms the conclusion drawn from the results in Table I, namely that large particle faujasite zeolite used in a petroleum cracking catalyst confers a greater hydrothermal stability upon that catalyst than when conventional commercial NaY type faujasite zeolite is used.

Obviously, many modifications and variations of the invention may be made without departing from the essence and scope thereof and only such limitations should be applied as are indicated in the appended claims.

We claim:

1. A hydrocarbon conversion catalyst composition comprising a Y zeolite having a t plot effective particle size range of 0.6 to 1.0 micrometer dispersed in an inorganic oxide matrix.

2. The composition of claim 1 wherein said zeolite is rare earth exchanged and has a unit cell size between 24.55–24.70 A.

3. The composition of claim 1 wherein said zeolite contains less than about 5 weight percent $Na_2O$.

4. The composition of claim 3 wherein said zeolite is converted to ultrastable form having a unit cell dimension of below about 24.60 A.

5. The composition of claim 1 wherein said catalyst contains from about 5 to 50 weight percent zeolite.

6. The composition of claim 1 wherein said inorganic oxide matrix is selected from the group consisting of silica, alumina, silica-alumina sols and gels, clay and mixtures thereof.

7. The composition of claim 1 wherein said catalyst is a catalytic cracking catalyst.

8. The composition of claim 1 wherein said zeolite has a silica to alumina ratio of from about 4.5 to 6.

9. A process for converting hydrocarbons which comprises reacting a hydrocarbon feedstock with the catalyst of claim 1 under hydrocarbon conversion reaction conditions.

10. The process of claim 9 wherein said conversion process is conducted at a temperature in excess of about 400° C., and said catalyst is subsequently regenerated at a temperature in excess of about 600° C.

11. The process of claim 9 wherein greater than 20 weight percent of said feedstock boils at a temperature in excess of 482° C.

* * * * *